US012618383B2

(12) United States Patent　　(10) Patent No.:　US 12,618,383 B2

Miossec et al.　　(45) Date of Patent:　May 5, 2026

(54) ASSEMBLY FOR AN EXHAUST CONE OF AN AIRCRAFT TURBOMACHINE

(71) Applicant: SAFRAN NACELLES,
　　　Gonfreville-L'Orcher (FR)

(72) Inventors: Tony Miossec, Moissy-Cramayel (FR);
　　　Fabien Bravin, Moissy-Cramayel (FR);
　　　Vincent Devanlay, Moissy-Cramayel
　　　(FR); Marc Versaevel,
　　　Moissy-Cramayel (FR); **Valentin
　　　Simeon,** Moissy-Cramayel (FR)

(73) Assignee: SAFRAN NACELLES,
　　　Gonfreville-L'Orcher (FR)

( * ) Notice:　Subject to any disclaimer, the term of this
　　　patent is extended or adjusted under 35
　　　U.S.C. 154(b) by 20 days.

(21) Appl. No.:　18/714,363

(22) PCT Filed:　Dec. 2, 2022

(86) PCT No.:　PCT/FR2022/052219
　　　§ 371 (c)(1),
　　　(2) Date:　May 29, 2024

(87) PCT Pub. No.: WO2023/099851
　　　PCT Pub. Date: Jun. 8, 2023

(65)　　　Prior Publication Data
　　　US 2025/0035069 A1　　Jan. 30, 2025

(30)　　Foreign Application Priority Data

Dec. 3, 2021　(FR) ...................................... 2112894

(51) Int. Cl.
　　　*F02K 1/82*　　　　(2006.01)
(52) U.S. Cl.
　　　CPC ........ *F02K 1/827* (2013.01); *F05D 2220/323*
　　　　　(2013.01); *F05D 2260/963* (2013.01)

(58) Field of Classification Search
　　　CPC .............. F02K 1/827; F05D 2220/323; F05D
　　　　　　2260/963; F05D 2260/96
　　　See application file for complete search history.

(56)　　　　References Cited

U.S. PATENT DOCUMENTS

2015/0034412 A1*　2/2015　Mecuson ................ F01D 25/30
　　　　　　　　　　　　　　　　181/256
2023/0085562 A1*　3/2023　Strutt ...................... F02K 1/827
　　　　　　　　　　　　　　　　181/213

(Continued)

FOREIGN PATENT DOCUMENTS

FR　　2 987 079 A1　　8/2013
FR　　3 095 476 A1　　10/2020
FR　　3 100 575 A1　　3/2021

OTHER PUBLICATIONS https://web.archive.org/web/20130221121822/https://en.wikipedia.
org/wiki/Gas_turbine, wikipedia 2013.*

(Continued)

*Primary Examiner* — Rodolphe Andre Chabreyrie

(74) *Attorney, Agent, or Firm* — Oblon, McClelland,
Maier & Neustadt, L.L.P.

(57)　　　　ABSTRACT

An assembly for an exhaust cone of an aircraft turboma-
chine, including a first annular wall, and first partitions and
second partitions defining between them a plurality of
acoustic boxes distributed around the first wall, an assembly
formed by the first and the second partitions being fastened
to the first wall with first fastening members arranged
upstream and with second fastening members arranged
downstream, the first fastening members being offset cir-
cumferentially with respect to the second fastening mem-
bers.

11 Claims, 8 Drawing Sheets

(56) References Cited

U.S. PATENT DOCUMENTS

| | | | |
|---|---|---|---|
| 2024/0125238 A1* | 4/2024 | Slusarz | ................... F01D 5/186 |
| 2024/0159202 A1* | 5/2024 | Koroly | ..................... F02C 7/24 |

OTHER PUBLICATIONS

Wikipedia page, webback machine (Year: 2013).*
International Search Report Issued Mar. 23, 2023, in PCT/FR2022/052219, filed on Dec. 2, 2022, 2 pages.

* cited by examiner

1

ASSEMBLY FOR AN EXHAUST CONE OF AN AIRCRAFT TURBOMACHINE

TECHNICAL FIELD

The invention relates to an assembly for an exhaust cone of an aircraft turbomachine, an exhaust cone for an aircraft turbomachine comprising such as assembly, as well as an aircraft turbomachine comprising such an exhaust cone.

PRIOR ART

Conventionally, an aircraft turbomachine comprises, from upstream to downstream in the gas flow direction in an axial direction, a fan, a low-pressure compressor, a high-pressure compressor, a combustion chamber, a high-pressure turbine, a low-pressure turbine and an exhaust nozzle comprising an exhaust case and an exhaust cone connected, upstream, to the exhaust case.

This exhaust cone comprises an annular upstream part fitted with acoustic enclosures to reduce the noise produced by the combustion of gases and/or the rotation of various turbine stages and propagating along the turbomachine, as well as a conical downstream part. These acoustic enclosures are formed by a first radially inner annular wall, a second radially outer annular wall and by straight partitions extending generally radially between the first and second walls and defining between them a honeycomb structure. The partitions are also assembled by brazing to the first wall. The acoustic enclosures formed in this way have small dimensions and a small volume, of around 1 cm³ to 2 cm³.

However, the use of such acoustic enclosures is not always appropriate. For example, it is ill-suited to absorbing low-frequency noise, which is the case for combustion noise. In addition, the brazed connection between the partitions and the first wall is not suitable for all types of material, such as ceramic matrix composites. It is also not appropriate for using different materials for the partitions and the first and second walls and for absorbing the forces generated by the differential thermal expansion between the partitions and the first and second walls as a result of using such different materials.

DISCLOSURE OF THE INVENTION

The present invention aims to overcome the aforementioned issues.

To this end, one object of the invention is an assembly for an exhaust cone of an aircraft turbomachine, comprising a first annular wall centred on a longitudinal axis running axially from upstream to downstream, a plurality of first partitions and second partitions extending substantially perpendicularly from the first wall, wherein the first partitions extend generally in the axial direction and are distributed circumferentially around the first wall, wherein the second partitions extend generally in a circumferential direction between the pairs of first adjacent partitions and are distributed circumferentially around the annular wall in at least one circumferential row, and wherein the first wall, the first partitions and the second partitions define between them a plurality of acoustic enclosures distributed around the first wall.

According to a first aspect of the invention, an arrangement formed by the first and the second partitions is fixed to the first wall by means of first fixing members arranged upstream and second fixing members arranged downstream, and in that the first fixing members are offset circumferentially relative to the second fixing members.

According to alternative embodiments of this first aspect of the invention which can be considered together or separately:

the first fixing members are mounted between second partitions of the most upstream circumferential row and an upstream portion of the first wall;

the first fixing members are mounted on one side only, on the downstream side, of said second partitions in the axial direction;

each first fixing member is separated from the first fixing members circumferentially adjacent thereto by one or two first partitions;

the first fixing members are mounted between first partitions and an upstream portion of the first wall;

the first fixing members are mounted upstream of the circumferential rows of second partitions;

the first fixing members are mounted on each side of said first partitions in the circumferential direction;

the second fixing members are mounted between first partitions and a downstream portion of the first wall downstream of the circumferential rows of second partitions;

the second fixing members are mounted on each side of said first partitions in the circumferential direction;

each second fixing member is mounted on one side only of said first partitions in the circumferential direction, opposite another second fixing member.

According to a second aspect of the invention, which may or may not be combined with the first aspect, the second partitions are curved partitions comprising at least one arcuate portion in the axial direction upstream or downstream.

According to alternative embodiments of this second aspect of the invention which can be considered together or separately:

the arcuate portions of the second partitions of at least one of the circumferential rows define a pattern that repeats along said circumferential row and the pattern of the arcuate portions of the second partitions of said circumferential row consists of an upstream or downstream arcuate portion such that all the arcuate portions of the second partitions of said circumferential row are oriented in the same axial direction, upstream or downstream;

the arcuate portions of the second partitions of at least one of the circumferential rows define a pattern that repeats along said circumferential row and the pattern of the arcuate portions of the second partitions of said circumferential row consists of an upstream arcuate portion followed by a downstream arcuate portion, so as to obtain an alternating upstream arcuate portion and downstream arcuate portion along said circumferential row;

the arcuate portions of the second partitions of at least one of the circumferential rows define a pattern that repeats along said circumferential row and the pattern of the arcuate portions of the second partitions of said circumferential row consists of two upstream arcuate portions followed by two downstream arcuate portions, so as to obtain an alternation of two upstream arcuate portions and two downstream arcuate portions along said circumferential row;

along at least one of the circumferential rows, two or more successive arcuate portions are interposed between each pair of first adjacent partitions;

each second partition of at least one of the circumferential rows carries a single arcuate portion;

each second partition of at least one of the circumferential rows carries an upstream arcuate portion and a downstream arcuate portion.

Another object of the invention is an exhaust cone for an aircraft turbomachine comprising an assembly as described above.

Another object of the invention is an aircraft turbomachine, comprising an exhaust cone as described above.

BRIEF DESCRIPTION OF THE DRAWINGS

Other aspects, aims, advantages and features of the invention will become more apparent upon reading the following detailed description of preferred embodiments thereof, provided by way of non-limiting example and with reference to the appended drawings, in which.

DETAILED DESCRIPTION

Figure 1:
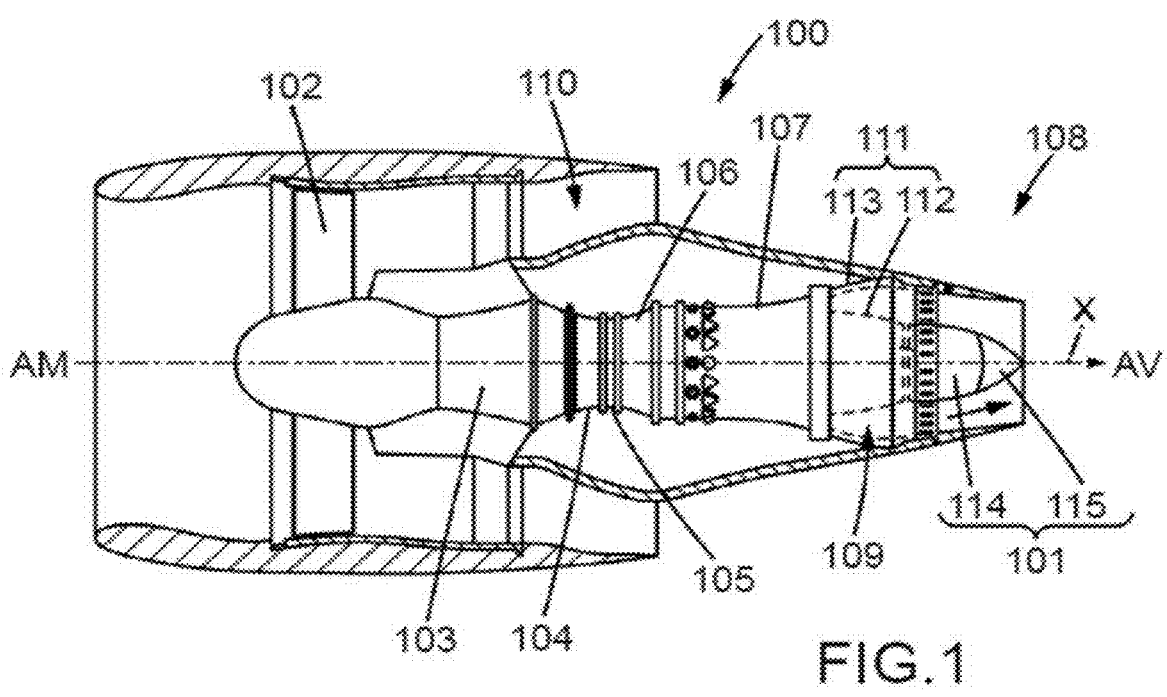
FIG. 1 is a schematic view in longitudinal section of a turbomachine comprising an exhaust cone fitted with an assembly according to one embodiment of the invention.

FIG. 1 shows an aircraft turbomachine 100 comprising an exhaust cone 101 fitted with an assembly 10 according to one embodiment of the invention. The exhaust cone 101 is shown in more detail in FIGS. 2 and 3.

Firstly, an axial direction, a radial direction orthogonal to the axial direction and a circumferential direction orthogonal to the axial and radial directions are defined.

The turbomachine 100 extends along a longitudinal axis X in an axial direction and comprises, from upstream AM to downstream AV in the gas flow direction in the axial direction, a fan 102, a low-pressure compressor 103, a high-pressure compressor 104, a combustion chamber 105, a high-pressure turbine 106, a low-pressure turbine 107 and an exhaust nozzle 108 comprising in particular the exhaust cone 101.

The turbomachine 100 also comprises, downstream of the fan 102, an annular primary flow channel 109, called the primary duct, along which a primary gas flow circulates and passes through the low-pressure compressor 103, the high-pressure compressor 104, the combustion chamber 105, the high-pressure turbine 106 and the low-pressure turbine 107, and an annular secondary flow channel 110, called the secondary duct, surrounding the primary duct 109 and along which a secondary gas flow circulates. The primary and secondary gas flows mix at the exhaust nozzle 108.

The turbomachine 100 also comprises, downstream of the low-pressure turbine 107 and upstream of the exhaust nozzle 108, an exhaust case 111 comprising a radially inner shell 112 and a radially outer shell 113 defining an annular space forming, downstream of the low-pressure turbine 107, part of the primary duct 109.

The exhaust cone 101 comprises, for example, an annular upstream part 114 connected to the radially inner shell 112 of the exhaust case 111 and comprising the assembly 10 according to the invention, and a conical downstream part 115 connected to the upstream part 114.

The assembly 10 according to the invention is shown in more detail in FIGS. 2 to 14. It comprises a first annular wall 11, first partitions 12 and second partitions 13.

Figures 3, 4:
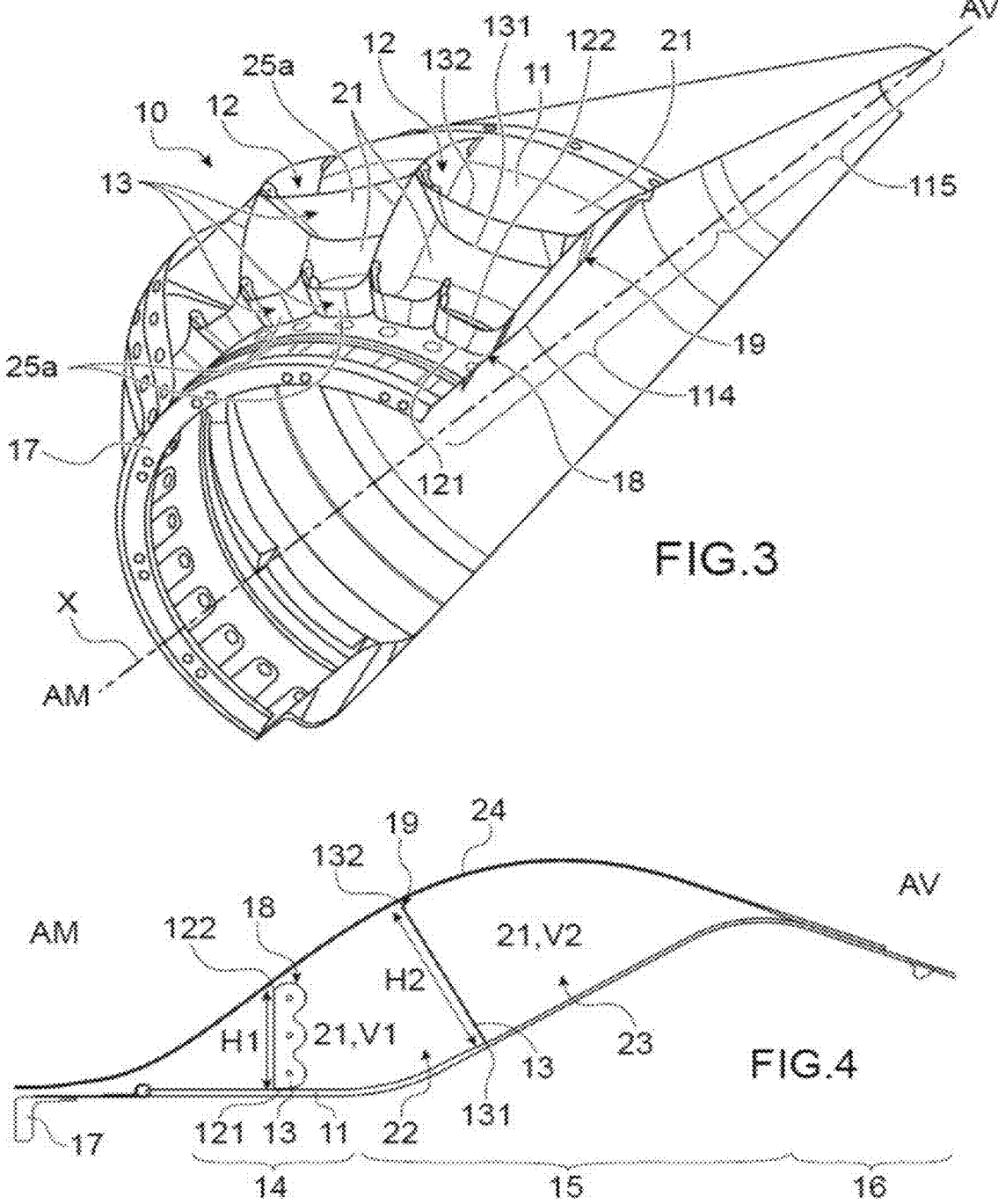
FIG. 3 is a partial perspective view of the exhaust cone shown in FIG. 2.
FIG. 4 is a partial view in longitudinal section of an exhaust cone shown in FIGS. 2 and 3.

The first wall 11 is centred on the longitudinal axis X. The first wall 11 can have, from upstream AM to downstream AV, a first generally cylindrical portion 14, a second generally frusto-conical portion 15 diverging downstream AV and a third generally frusto-conical portion 16 converging downstream AV (FIG. 4). The first wall 11 can also be fixed, upstream, to the radially inner shell 112 of the exhaust case 111, in particular via an upstream end 17 of its first portion 14. The first wall 11 can also be fixed, downstream, to the downstream part 115 of the exhaust cone 101. The first wall 11 is, for example, made of a ceramic matrix composite. More generally, it can be made with any type of material that is able to withstand temperatures greater than or equal to 450° C.

Figure 5:
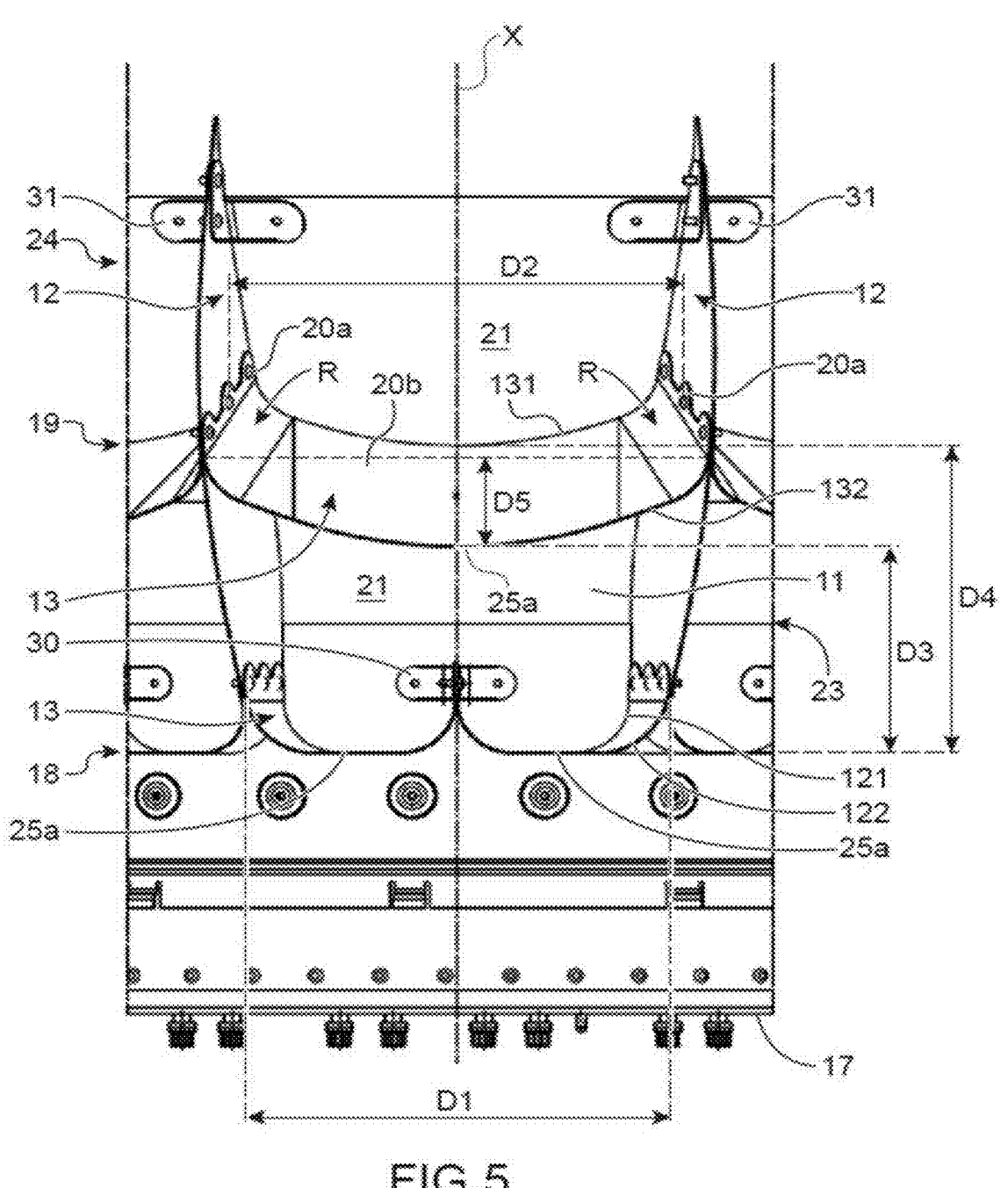
FIG. 5 is a partial radially outward view of the exhaust cone shown in FIGS. 2 to 4.

The first and second partitions 12, 13 extend substantially perpendicularly from the first wall 11 between a radially inner end edge 121, 131, arranged opposite the first wall 11, and a radially outer end edge 122, 132 (FIGS. 3 to 5). The first and second partitions 12, 13 are arranged radially outside the first wall 11. The first and second partitions 12, 13 can be made from metal, for example titanium or Inconel®. It is, for example, Inconel® 625 or Inconel® 718. The first and second partitions 12, 13 can also be made of a composite material, in particular ceramic matrix composite. More generally, they can be made with any type of material that is able to withstand temperatures greater than or equal to 450° C. The first partitions 12 also extend generally in the axial direction and are distributed circumferentially around the first wall 11, in particular evenly (FIG. 3). The first partitions 12 are, for example, identical in shape and size.

The second partitions 13 for their part extend generally in the circumferential direction between the pairs of first adjacent partitions 12 (FIG. 3). The second partitions 13 are also distributed circumferentially around the annular wall 11, in particular evenly, in at least one circumferential row 18, 19, for example two circumferential rows 18, 19 axially spaced apart from each other. The second partitions 13 of the most upstream circumferential row 18 can extend from the first portion 14 of the first wall 11, whilst the second partitions 13 of the most downstream circumferential row 19 can extend from the second portion 15 of the first wall 11. The second partitions 13 of the same circumferential row 18, 19 are, for example, identical in shape and size.

The second partitions 13 can be fixed, at each of their circumferential ends 20a, to the one of the first and second partitions 12, 13 that is circumferentially closest to it, in particular by riveting (FIG. 5). The first and second partitions 12, 13 thus form an integral or one-piece assembly. The circumferential ends 20$a$ of each of the second partitions 13 are, for example, formed by tabs extending generally axially from a central core 20$b$ of said second partition 13.

Along a circumferential row 18, 19, one or more second partitions 13 can be arranged between each pair of first adjacent partitions 12. In this way, for example, when a single second partition 13 of a circumferential row 18, 19 is arranged between a pair of first adjacent partitions 12, each of its circumferential ends 20$a$ is fixed to one of the first partitions 12 of said pair. When two second partitions 13 of a circumferential row 18, 19 are arranged between a pair of first adjacent partitions 12, one of the circumferential ends 20$a$ of said second partitions 13 is fixed to one of the first partitions 12 of said pair, and their other circumferential ends 20$a$ are fixed to one another.

The first wall 11, the first partitions 12 and the second partitions 13 also define between them a plurality of acoustic enclosures 21 distributed around the first wall 11 in at least one circumferential line 22, 23, for example two circumferential lines 22, 23 in axial succession. The acoustic enclosures 21 are in particular designed to absorb at least part of the noise generated by the combustion of gases in the combustion chamber 105, in particular low-frequency noise, typically between 300 Hz and 1000 Hz.

Each of the acoustic enclosures 21 is thus bounded radially inwards by the first wall 11, circumferentially by a pair of first partitions 12 and axially by one or more second partitions 13. For example, the acoustic enclosures 21 of the most upstream circumferential line 22 are bounded axially, upstream AM, by one or more second partitions 13 located between said pair of first partitions 12 and belonging to the most upstream circumferential row 18 and, downstream AV, by one or more second partitions 13 located between said pair of first partitions 12 and belonging to the most downstream circumferential row 19. The acoustic enclosures 21 of the most downstream circumferential line 23 for their part are bounded axially upstream AM by the second partitions 13 of the most downstream circumferential row 19. They can also be bounded downstream AV by the first wall 11, in particular its second portion 15.

Figure 2:
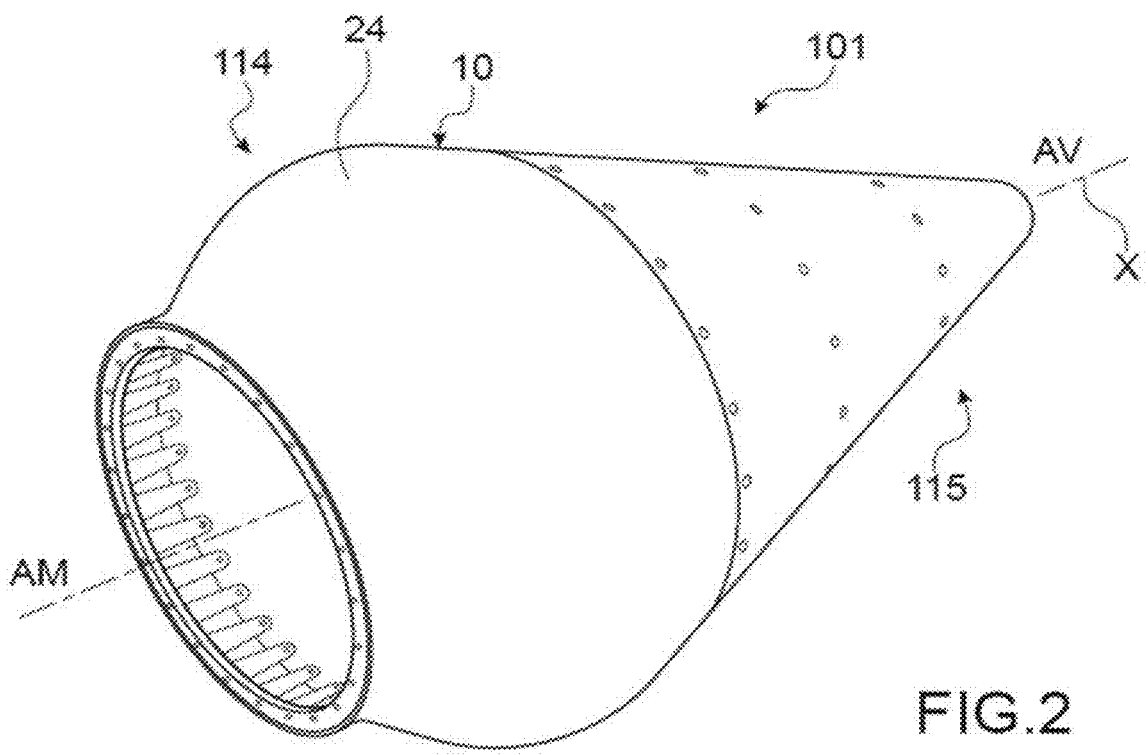
FIG. 2 is a perspective view of the exhaust cone shown in FIG. 1.

The acoustic enclosures 21 can also be bounded radially outwards by the second wall 24 which is centres on the longitudinal axis X (FIGS. 2 and 4). For example, the second wall 24 joins the first wall 12 downstream of the first partitions 12, in particular at the third portion 16 of the first wall 12. The second wall 24 is multi-perforated so as to allow some of the acoustic energy from the primary duct 109 to pass into the acoustic enclosures 21 and thus ensure a reduction in the noise generated by the combustion of gases in the combustion chamber 105. For example, the second wall 24 is fixed, downstream, to the conical downstream part 115 of the exhaust cone 101. The second wall 24 can be made of a ceramic matrix composite. More generally, it can be made with any type of material that is able to withstand temperatures greater than or equal to 450° C.

The dimensions and shape of the first wall 11, first partitions 12, second partitions 13 and if applicable second wall 24 are such that the acoustic enclosures 21 have large volumes, in particular volumes comprised between 3000 cm³ and 5000 cm³.

By way of example (FIGS. 4 and 5), a volume V1 of the acoustic enclosures 21 of the most upstream circumferential line 22 is substantially equal to 3710 cm³, whilst a volume V2 of the acoustic enclosures 21 of the most downstream circumferential line 23 is substantially equal to 4230 cm³. For this, a height H1 of the central core 20$b$ of the second partitions 13 of the most upstream circumferential row 18 is, for example, comprised between 50 and 60 mm inclusive, in particular substantially equal to 55 mm. A height H2 of the central core 20$b$ of the second partitions 13 of the most downstream circumferential row 19 is, for example, comprised between 110 and 135 mm inclusive, in particular substantially equal to 123 mm. "Height" is understood to mean a dimension of the central core 20$b$ of the second partitions 13, taken perpendicularly to the first wall 11, between their radially inner 131 and outer 132 end edges. A distance D1 between each pair of first adjacent partitions 12, taken at the radially outer end edge 122 of said first partitions 12 and at the most upstream circumferential row 18 of second partitions 13, is for example comprised between 190 and 230 mm, in particular substantially equal to 210 mm. A distance D2 between each pair of first adjacent partitions 12, taken at mid-height between their radially inner 121 and outer 122 end edges and at the most downstream circumferential row 19 of second partitions 13, is for example comprised between 225 and 275 mm, in particular substantially equal to 250 mm. A distance D3, taken in the axial direction, between the most upstream point of the radially outer end edge 132 of the second partitions 13 of the most upstream circumferential row 18 and the most upstream point of the radially outer end edge 132 of the second partitions 13 of the most downstream circumferential row 19, is for example comprised between 110 and 140 mm, in particular substantially equal to 124 mm. A distance D4, taken in the axial direction, between the most upstream point of the radially outer end edge 132 of the second partitions 13 of the most upstream circumferential row 18 and the most upstream point of the radially inner end edge 131 of the second partitions 13 of the most downstream circumferential row 19, is for example comprised between 165 and 200 mm, in particular substantially equal to 183 mm.

Figures 12, 13:
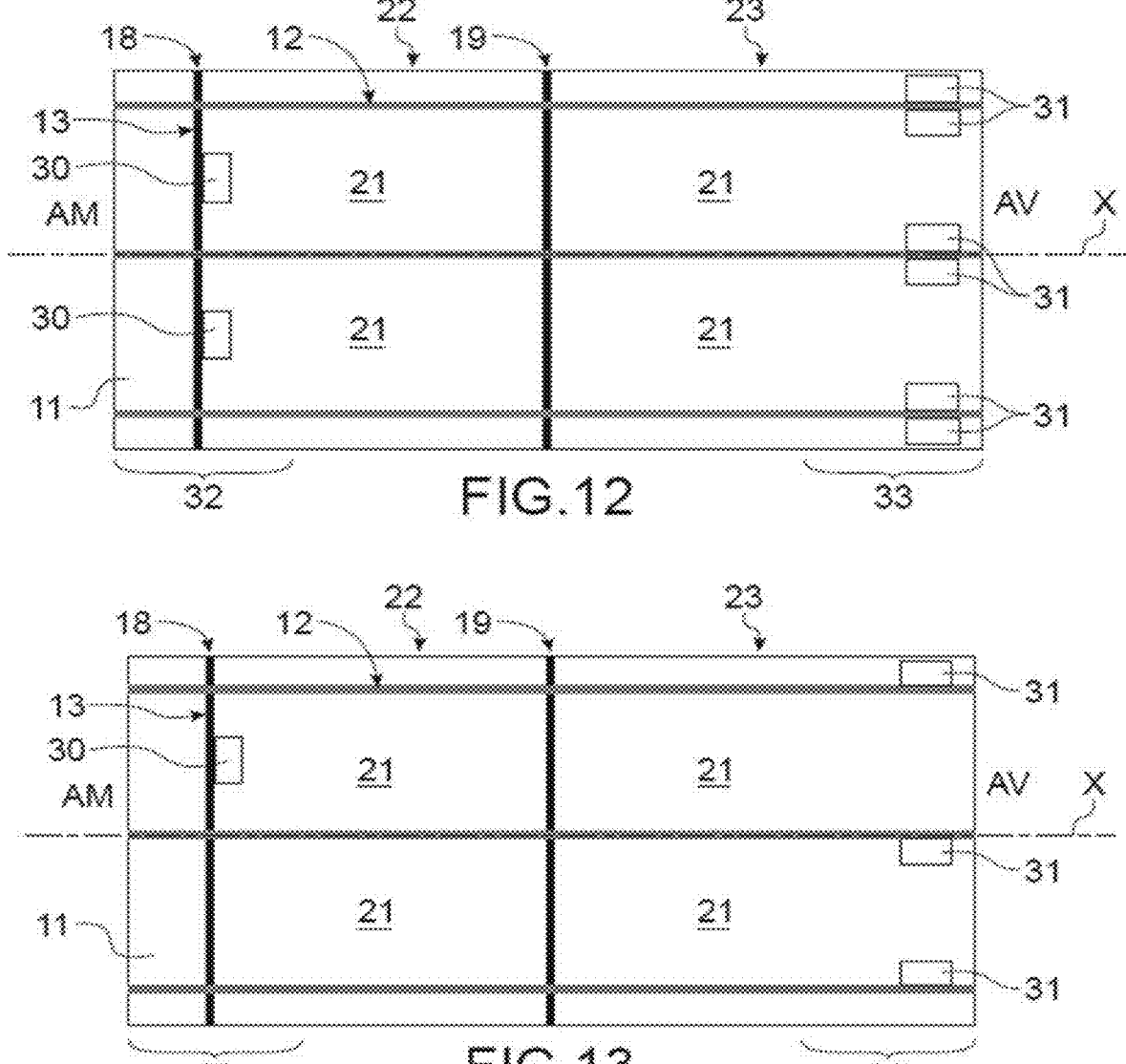
FIG. 12 is a partial schematic radially outward view of an exhaust cone according to one embodiment of the invention.
FIG. 13 is a partial schematic radially outward view of an exhaust cone according to one embodiment of the invention.
Figure 14:
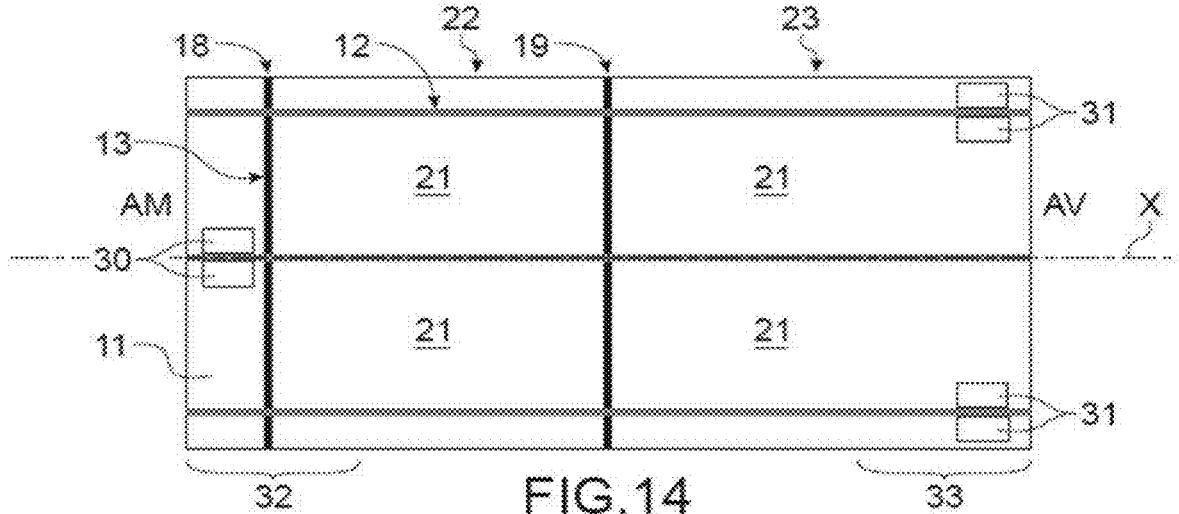
FIG. 14 is a partial schematic radially outward view of an exhaust cone according to one embodiment of the invention.

According to a first aspect of the invention, shown in FIGS. 12 to 14, the arrangement formed by the first and the second partitions 12, 13 is fixed to the first wall 11 by means of first fixing members 30 arranged upstream and second fixing members 31 arranged downstream. The first and second fixing members 30, 31 form mechanical point connections, such as fittings. The first fixing members 30 are also offset circumferentially relative to the second fixing members 31. The first fixing members 30 and the second fixing members 31 are thus misaligned in the axial direction. It is understood here that the assembly 10 has no other means of fixing the first and second partitions 12, 13 to the first wall 11. In this way, the first partitions 12 can only be fixed to the first wall 11 upstream or downstream, but not both, which allows the first partitions 12 to expand freely, in particular in the axial direction. This improves the mechanical strength of the acoustic enclosures 21.

The first fixing members 30 are mounted between first and/or second partitions 12, 13 and an upstream portion 32 of the first wall 11. The upstream portion 32 is, for example, formed in the first portion 14 of the first wall 11. The first fixing members 30 can also be generally aligned circumferentially with one another.

The second fixing members 31 are mounted between first and/or second partitions 12, 13 and a downstream portion 33 of the first wall 11. The downstream portion 33 is, for example, formed in the second portion 15 of the first wall 11. The second fixing members 31 can also be generally aligned circumferentially with one another.

Each first partition 12 is, for example, mounted on the first wall 11, either upstream by one or more first fixing members 30, or downstream by one or more second fixing members 31. In other words, first or second fixing members 30, 31 are, for example, mounted between each first partition 12 and the first wall 11. In FIGS. 12 and 13, each first partition 12 is mounted on the first wall 11 by means of one or two second fixing members 31. In FIG. 14, the first partitions 12 are alternately mounted on the first wall 11 upstream by means of two first fixing members 30 and downstream by means of two second fixing members 31.

According to one embodiment of the first aspect of the invention, the first fixing members 30 are mounted between second partitions 13 of the most upstream circumferential row 18 and the upstream portion 32 of the first wall 11. This is the case, for example, for the first fixing members 30 in FIGS. 12 and 13. The first fixing members 30 can also be mounted on one side only, in particular on the downstream side as is the case in FIGS. 12 and 13, of said second partitions 13 in the axial direction. Each first fixing member 30 can also be separated from the first fixing members 30 circumferentially adjacent thereto by one or two first partitions 12. In FIG. 12, a first fixing member 30 is arranged in each acoustic enclosure 21 of the most upstream circumferential line 22. In FIG. 13, a first fixing member 30 is arranged in every second acoustic enclosure 21 of the most upstream circumferential line 22.

Alternatively, the first fixing members 30 are mounted between first partitions 12 and the upstream portion 32 of the first wall 11, in particular upstream of the circumferential rows 18, 19 of second partitions 13. This is the case, for example, for the first fixing members 30 in FIG. 14. Of course, in this case, no second fixing member 31 can be mounted between said first partitions 12 and the downstream portion 33 of the first wall 11. The first fixing members 30 can also be mounted on each side of said first partitions 12 in the circumferential direction.

According to one embodiment of the first aspect of the invention, the second fixing members 31 are mounted between first partitions 12 and the downstream portion 33 of the first wall 11, in particular downstream of the circumferential rows 18, 19 of second partitions 13. This is the case, for example, in FIGS. 12 to 14. The second fixing members 31 can be mounted on each side of said first partitions 12 in the circumferential direction. This is the case, for example, for the second fixing members 31 in FIGS. 12 and 14. Alternatively, each second fixing member 31 is mounted on one side only of said first partitions 12 in the circumferential direction, in particular opposite another second fixing member 31. The second fixing members 31 can thus be arranged in every second acoustic enclosure 21 or more of the most downstream circumferential line 23. This is the case, for example, for the second fixing members 31 in FIG. 13.

According to a second aspect of the invention, which may or may not be combined with the first aspect, the second partitions 13 are curved partitions comprising at least one arcuate portion 25a, 25b in the axial direction upstream AM or downstream AV (FIGS. 2 to 11). The arcuate portion(s) 25a, 25b is/are in particular formed in the central core 20b of the second partitions 13. This makes it possible, on the one hand, to limit the stresses induced by thermal expansion in the acoustic enclosures 21, in particular in the circumferential direction, for example when the exhaust gases from the turbomachine 100 are at high temperature such as temperatures ranging from 600 to 650° C. On the other hand, this makes it possible to reduce the axial forces exerted on the second partitions 13 as a result of the gas pressure in the acoustic enclosures 21, and which therefore have to be borne by the acoustic enclosures 21, and thus to improve the mechanical strength of the acoustic enclosures 21.

The arcuate portions 25a, 25b of the second partitions 13 of each circumferential row 18, 19 define in particular a pattern that repeats along said circumferential row 18, 19.

According to one embodiment of this second aspect of the invention, the pattern of the arcuate portions 25a, 25b of the second partitions 13 of at least one of the circumferential rows 18, 19 consists of an upstream AM arcuate portion 25a or a downstream AV arcuate portion 25b. In this way, all of the arcuate portions 25a, 25b of the second partitions 13 of said circumferential row 18, 19 are oriented in the same axial direction, upstream AM or downstream AV. In FIGS. 3, 5, 6 and 11, the arcuate portions 25a of the second partitions 13 of the two circumferential rows 18, 19 are oriented upstream AM.

Figures 6, 7:
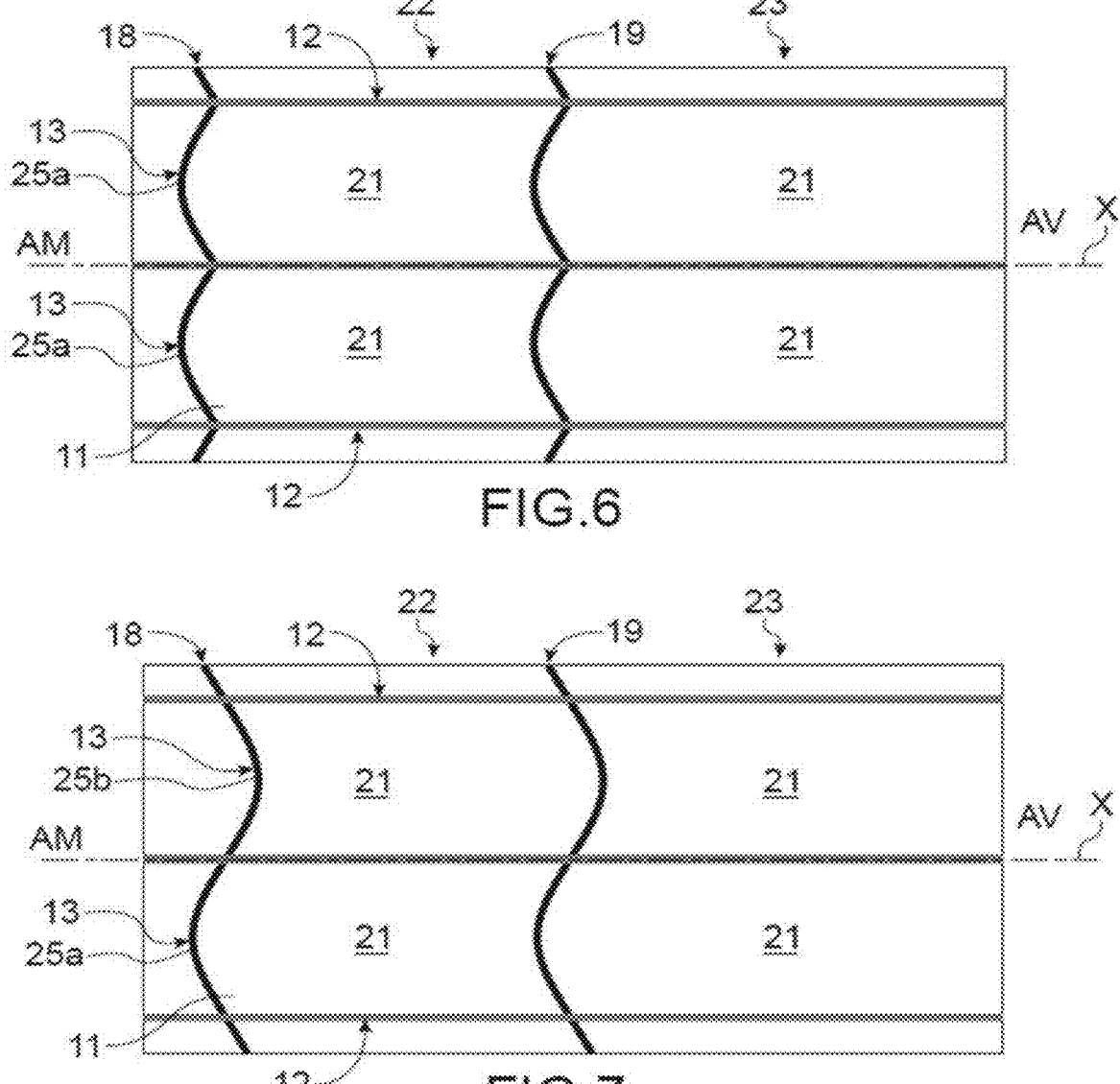
FIG. 6 is a partial schematic radially outward view of an exhaust cone according to one embodiment of the invention.
FIG. 7 is a partial schematic radially outward view of an exhaust cone according to one embodiment of the invention.
Figures 8, 9:
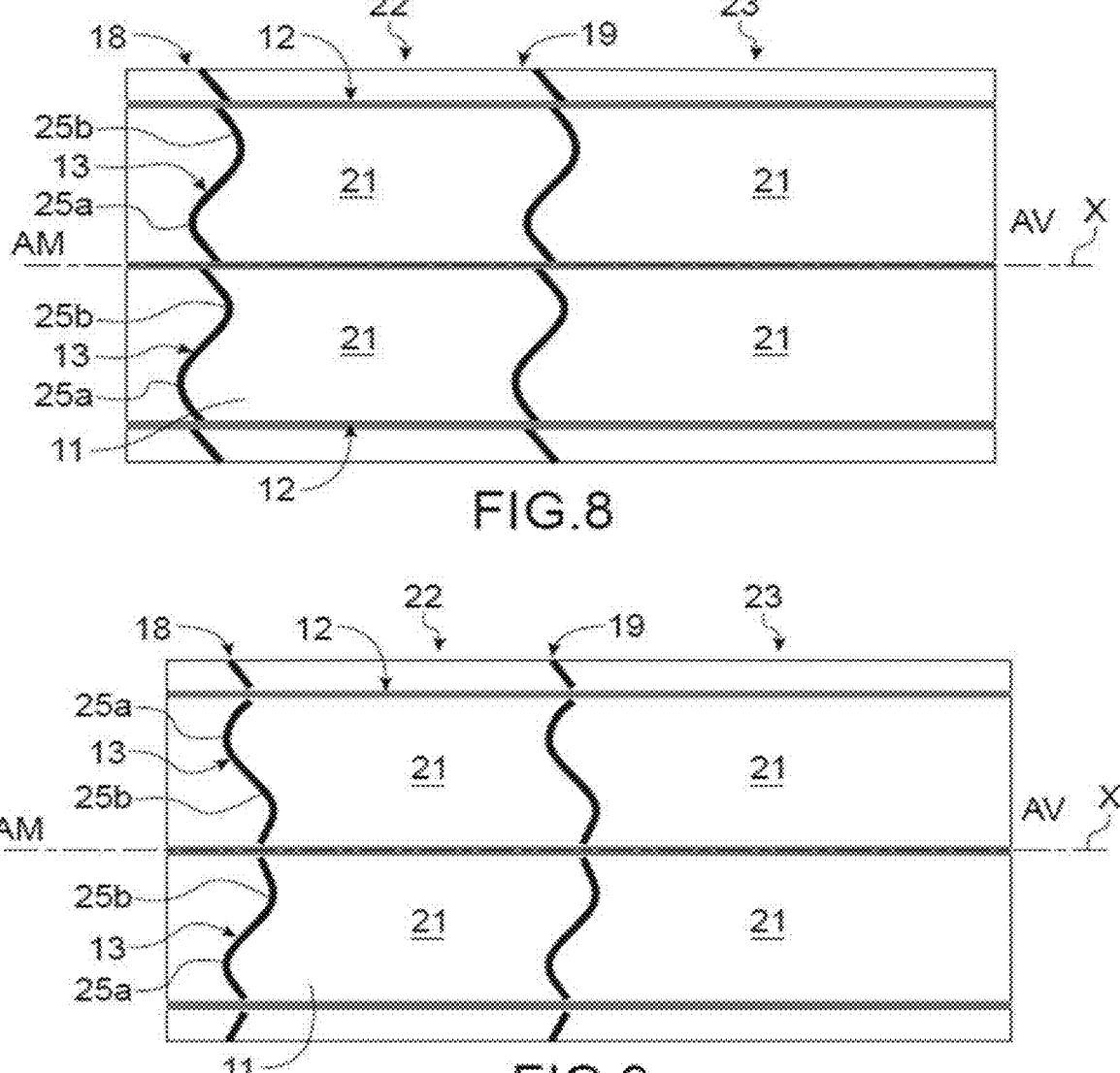
FIG. 8 is a partial schematic radially outward view of an exhaust cone according to one embodiment of the invention.
FIG. 9 is a partial schematic radially outward view of an exhaust cone according to one embodiment of the invention.
Figures 10, 11:
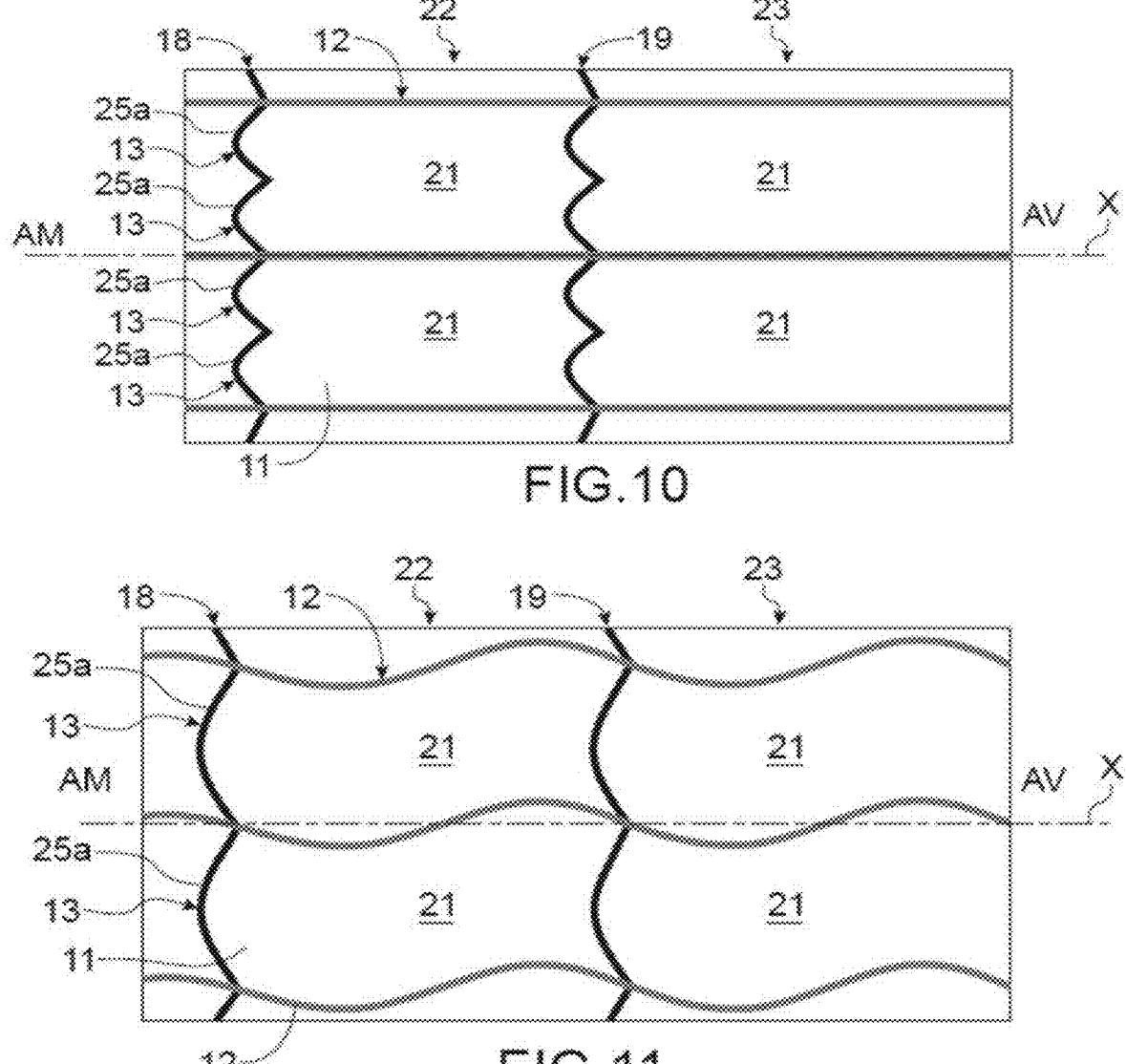
FIG. 10 is a partial schematic radially outward view of an exhaust cone according to one embodiment of the invention.
FIG. 11 is a partial schematic radially outward view of an exhaust cone according to one embodiment of the invention.

According to one embodiment of this second aspect of the invention, the pattern of the arcuate portions 25a, 25b of the second partitions 13 of at least one of the circumferential rows 18, 19 consists of an upstream AM arcuate portion 25a followed by a downstream AV arcuate portion 25b, so as to obtain an alternating upstream AM arcuate portion 25a and downstream AV arcuate portion 25b along said circumferential row 18, 19. In FIGS. 7 and 8, the two circumferential rows 18, 19 have such an alternating upstream AM arcuate portion 25a and downstream AV arcuate portion 25b.

According to one embodiment of this second aspect of the invention, the pattern of the arcuate portions 25a, 25b of the second partitions 13 of at least one of the circumferential rows 18, 19 consists of two upstream AM arcuate portions 25a followed by two downstream AV arcuate portions 25b, so as to obtain an alternation of two upstream AM arcuate portions 25a and two downstream AV arcuate portions 25b along said circumferential row 18, 19. In FIG. 9, the two circumferential rows 18, 19 have such an alternation of two upstream AM arcuate portions 25a and two downstream AV arcuate portions 25b.

According to one embodiment of this second aspect of the invention, along at least one of the circumferential rows 18, 19, two or more successive arcuate portions 25a, 25b are interposed between each pair of first adjacent partitions 12. This is the case, for example, for the most upstream circumferential row 18 in FIGS. 3 and 5 where two upstream AM arcuate portions 25a, 25b are interposed between each pair of first adjacent partitions 12, and for the two circumferential rows 18, 19 in FIG. 10 where two arcuate portions 25a are oriented in the same axial direction, upstream AM, between each pair of first adjacent partitions 12. This is also the case, for example, for the two circumferential rows 18, 19 in FIGS. 8 and 9 where two arcuate portions 25a, 25b are oriented alternately upstream AM and downstream AV between each pair of first adjacent partitions 12.

According to one embodiment of this second aspect of the invention, each second partition 13 of at least one of the circumferential rows 18, 19 carries a single arcuate portion 25a, 25b. This is the case, for example, in FIGS. 3, 5, 6, 7, 10 and 11.

According to one embodiment of this second aspect of the invention, each second partition 13 of at least one of the circumferential rows 18, 19 carries an upstream AM arcuate portion 25a and a downstream AV arcuate portion 25b. This is the case, for example, in FIGS. 8 and 9.

For example, a distance D5, taken in an axial plane and at the radially outer end edge 132 of each second partition 13, between an apex of the or one of the arcuate portions 25a, 25b of said second partition 13 and the circumferential ends of the central core 20*b* of said second partition 13 is greater than or equal to 20 mm (FIG. 5). "Apex" is to be understood to mean the most upstream point (in the case of an upstream AM arcuate portion 25*a*) and the most downstream point (in the case of a downstream AV arcuate portion) of the radially outer end edge 132 of the second partition 13.

Each second partition 13 can also have a transition radius R between each of its circumferential ends 20*a* and the apex of the arcuate portion 25*a*, 25*b* of said second partition 13, which is adjacent thereto, greater than or equal to 20 mm (FIG. 5).

According to one embodiment of this second aspect of the invention, the first partitions 12 are corrugated in the axial direction. This is the case, for example, in FIG. 11.

The invention claimed is:

1. An assembly of an exhaust cone of an aircraft turbomachine, comprising:

a first annular wall centered on a longitudinal axis running axially from upstream to downstream, and first partitions and second partitions extending substantially perpendicularly from the first annular wall, wherein the first partitions extend generally in an axial direction and are distributed circumferentially around the first annular wall, wherein the second partitions extend generally in a circumferential direction between pairs of adjacent first partitions of the first partitions and are distributed circumferentially around the first annular wall in at least one circumferential row, wherein the first annular wall, the first partitions, and the second partitions define therebetween a plurality of acoustic enclosures distributed around the first annular wall and absorbing combustion gas noises from the aircraft turbomachine, wherein an arrangement formed by the first and the second partitions is fixed to the first annular wall with first fixing members arranged upstream relative to second fixing members and the second fixing members arranged downstream relative to the first fixing members, the first fixing members including all fixing members disposed at a same first axial location and the second fixing members including all fixing members disposed at a same second axial location, the first fixing members and the second fixing members forming mechanical point connections, and wherein each first fixing member of the first fixing members is offset circumferentially relative to each second fixing member of the second fixing members.

2. The assembly according to claim 1, wherein the first fixing members are mounted between the second partitions of a most upstream circumferential row of the at least one circumferential row and an upstream portion of the first annular wall.

3. The assembly according to claim 2, wherein the first fixing members are mounted on only a downstream side of the second partitions in the axial direction and/or wherein each first fixing member of the first fixing members is separated from an adjacent first fixing member circumferentially adjacent thereto by one or two first partition of the first partitions.

4. The assembly according to claim 1, wherein the first fixing members are mounted between the first partitions and an upstream portion of the first annular wall.

5. The assembly according to claim 4, wherein the first fixing members are mounted upstream of the at least one circumferential row of the second partitions and/or the first fixing members are mounted on each side of the first partitions in the circumferential direction.

6. The assembly according to claim 1, wherein the second fixing members are mounted between the first partitions and a downstream portion of the first annular wall downstream of the at least one circumferential row of the second partitions.

7. The assembly according to claim 6, wherein the second fixing members are mounted on each side of the first partitions in the circumferential direction or wherein each second fixing member of the second fixing members is mounted on only one side of the first partitions in the circumferential direction, opposite another second fixing member of the second fixing members.

8. The assembly according to claim 1, wherein the second partitions are curved partitions comprising at least one arcuate portion in the axial direction in an upstream or downstream orientation.

9. An exhaust cone comprising the assembly according to claim 1.

10. An aircraft turbomachine, comprising the exhaust cone according to claim 9.

11. The assembly according to claim 1, wherein a distance between each of the pairs of adjacent first partitions of the first partitions at a radially outer end edge of the first partitions and at a most upstream circumferential row of the at least one circumferential row of the second partitions is less than a distance between each of the pairs of adjacent first partitions of the first partitions at a mid-height between radially inner and outer end edges thereof and at a most downstream circumferential row of the at least one circumferential row of the second partitions.

* * * * *